US008938033B2

(12) United States Patent
Bi et al.

(10) Patent No.: US 8,938,033 B2
(45) Date of Patent: Jan. 20, 2015

(54) ENHANCED LOW POWER ACTIVE RADIO RECEPTION

(71) Applicant: Intel Corporation, Santa Clara, CA (US)

(72) Inventors: Dongsheng Bi, Fremont, CA (US); Binuraj K. Ravindran, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/836,417

(22) Filed: Mar. 15, 2013

(65) Prior Publication Data

US 2014/0270006 A1 Sep. 18, 2014

(51) Int. Cl.

| | |
|---|---|
| ***H03D 1/00*** | (2006.01) |
| ***H04L 27/06*** | (2006.01) |
| ***H04H 20/59*** | (2008.01) |
| ***H04H 20/31*** | (2008.01) |
| ***H04H 20/33*** | (2008.01) |

(52) U.S. Cl.

CPC ............... *H04H 20/59* (2013.01); *H04H 20/31* (2013.01); *H04H 20/33* (2013.01)

USPC ............................ 375/340; 375/262; 375/259

(58) Field of Classification Search

CPC ..... G08B 27/008; H04H 20/59; H04H 21/814

USPC ........................ 375/340, 341; 455/182.1, 230

See application file for complete search history.

(56) References Cited

U.S. PATENT DOCUMENTS

| | | | | |
|---|---|---|---|---|
| 8,138,915 | B2 * | 3/2012 | Milbar | 340/539.14 |
| 2012/0082271 | A1 * | 4/2012 | Elenes et al. | 375/343 |
| 2013/0210340 | A1 * | 8/2013 | Pharn | 455/3.01 |

OTHER PUBLICATIONS

Wright, Scott, “RBDS versus RDS—What are the differences and how can receivers cope with both systems” National Radio Systems Committee(NRSC) Jan. 1998, pp. 2-11.*

* cited by examiner

*Primary Examiner* — Qutbuddin Ghulamali

(74) *Attorney, Agent, or Firm* — Ellis B. Ramirez; Prass LLP

(57) ABSTRACT

A method and system for offline processing alert messages (AR) on a digital radio broadcast receiver is described. A digital radio broadcast signal is received at the digital radio broadcast receiver. AR receivers will constantly look for AR alerts at a periodic interval by monitoring the station information service (SIS) on Primary IBOC Data Service (PIDS) channel to maximize the battery life at the same time achieving a reasonable latency in receiving AR alerts.

18 Claims, 6 Drawing Sheets

ENHANCED LOW POWER ACTIVE RADIO RECEPTION

TECHNICAL FIELD

The present invention relates, generally, to communication networks, and in particular to a system and method for automatic reception of active radio messages in receivers, such as may be useful to improve power consumption, and/or minimizing processor burden.

BACKGROUND

The increasingly popular High Definition (HD) Radio® standard allows for simultaneous broadcast of digital and analog signals. HD Radio® operates under standards adopted by the National Radio Systems Committee (NRSC). The NRSC-5 standard describes a digital radio frequency (RF) broadcast system that delivers digital audio and data services to receivers from terrestrial transmitters on existing Frequency Modulation (FM) and Amplitude Modulation (AM) radio. The NRSC-5 standard uses in-band on channel (IBOC) orthogonal frequency division multiplexing (OFDM) technology to carry digital data stream over the AM and FM bands. The system allows for coexistence of the digital modulated signal alongside the legacy analog FM and AM transmission whereby an NRSC-5 system can provide several services such multiple audio streams and data services in a single frequency band.

Active Radio (AR) feature in HD Radio® alerts the public about emergency and life-threatening situations. It also provides time critical and life saving follow up information. This is a feature that will be supported by IBOC (In-Band on Channel) radio broadcasting receivers. According to NRSC-5[1] standard, IBOC receivers are supposed to monitor for AR message at regular intervals. Radio receivers will wake up at periodic intervals to look for AR messages on a specific FM (Frequency Modulation) frequency. If there is an AR transmission, it will receive the alert and other related information. If the receiver cannot acquire AR reception, it will go back to stand-by mode to save power.

On a battery operated device like a mobile receiver, monitoring for AR messages at periodical interval can have a significant impact on the receiver's stand-by time (battery life). One of the reasons for this impact is the high power consumption of the HD Radio® receivers which is substantial based on the current standards. The actual stand-by time will vary, depending on the duty-cycle of the monitoring, which in turn is a compromise between a faster AR message detection time and a longer stand-by time.

For the reasons stated above, and for other reasons stated below which will become apparent to those skilled in the art upon reading and understanding the present specification, there is a need in the art for a faster way to monitoring AR messages with minimal impact on stand-by time.

DETAILED DESCRIPTION OF THE DISCLOSED EMBODIMENTS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
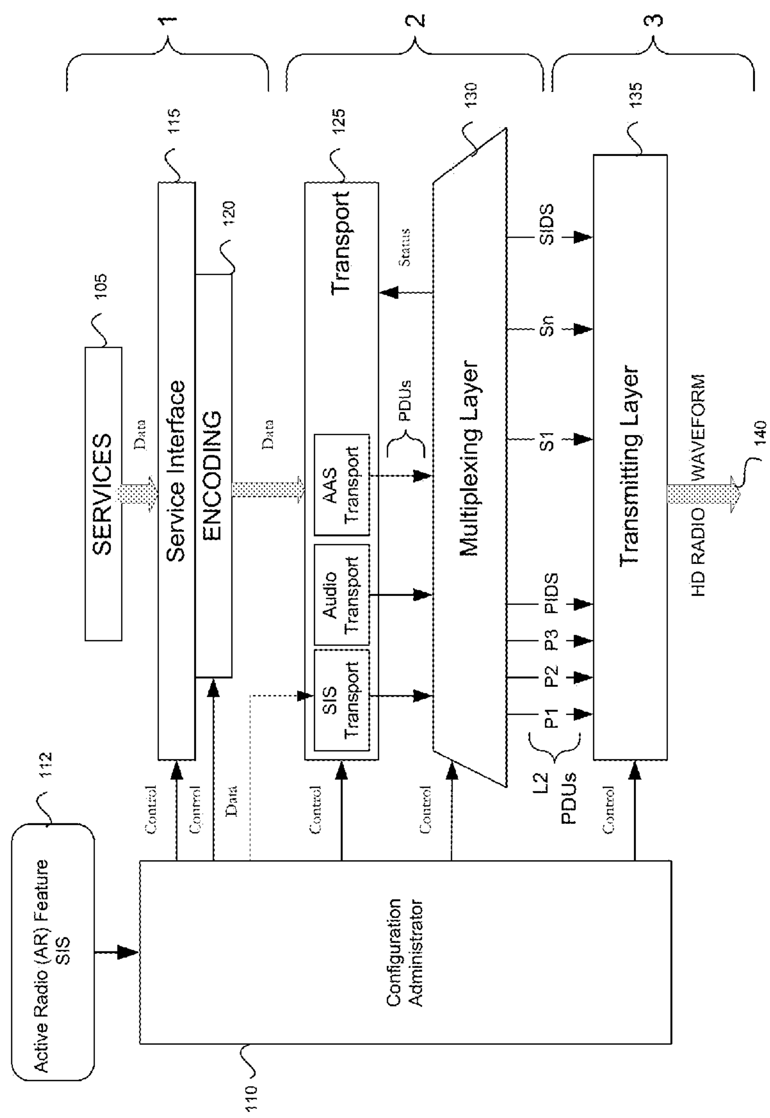
FIG. 1 illustrates an IBOC system to broadcast an in-band on-channel (IBOC) format signal with active radio (AR) message in accordance to an embodiment.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

As used herein, digital radio broadcasting (DRB) is a multichannel signal that includes the transmission of one or more programs in a single digital radio broadcasting channel or on a single digital radio broadcasting signal. The DRB can have several different stream types: program service data (PSD); station information service (SIS) data; and advanced data services (ADS). DRB technology delivers digital audio and data services to mobile, portable, and fixed receivers. One type of digital radio broadcasting, referred to as in-band on-channel (IBOC) digital audio broadcasting, uses transmitters in the existing Medium Frequency (MF), Short Wave (SW), and Very High Frequency (VHF) radio bands and uses modulation techniques like Amplitude Modulation (AM), Frequency Modulation (FM). The other types of digital radio broadcasting may be Digital Audio Broadcasting (DAB) or Digital Radio Mondiale (DRM) which are more popular in European Counties and Australia. It is also applicable to satellite radio which is broadcast over S and L Band.

FIG. 1 illustrates an IBOC system 100 to broadcast an in-band on-channel (IBOC) signal with active radio (AR) message in accordance to an embodiment. An IBOC system 100 is a logical protocol stack that can be partitioned into three distinct sub-systems, including audio and data input subsystems primarily comprising services 105, service interface 115, and encoding 120; transport and service multiplex subsystem primarily comprising a transport layer 125 and channel multiplexing layer 130; and RF/transmission subsystem shown transmitting layer 135. A configuration administrator 110 supplies configuration and control information to the various entities within the protocol stack. The configuration/control information can include user defined settings such as Active Radio feature and SIS data, as well as information generated from within the system such as time and position.

The audio and data subsystem describes the encapsulation of audio streams and data streams (services 105) into packets that can be sent over the IBOC system 100. In IBOC a plurality of signal formats are defined, such as a hybrid format in which the digital radio broadcast signal is multiplexed onto the conventional analog radio broadcast signal, and an all digital format consisted of only digital signals, and it is designed to gradually transfer from conventional analog radio broadcast to all digital radio broadcast that has many functions and is high in quality. In IBOC digital broadcast signals are transmitted with Orthogonal Frequency Division Multiplexing (OFDM) that uses many carriers (subcarriers). The audio streams in the IBOC system include a primary audio stream (MPS) and may include one or more secondary audio streams (SPS). The source for the primary audio stream may be a duplication of the audio stream carried over the analog signal. The source for the secondary audio channels may be new audio content not available in the analog broadcast signal. The digital data can have several different stream types: program service data (PSD); station information service (SIS) data; advanced data services (ADS), and active radio (AR) feature data. SIS data can also be inserted into the stream by configuration administrator 110.

The SIS data may provide general information about the station programming as well as technical information. SIS may also include station identification number, station call letters, station name, station location, and station time. SIS may also include an arbitrary text message.

Examples of ADS may be presentations of stock, news, alerts, weather, real time traffic and entertainment programming including audio, text and images.

The AR alerts the public about emergency and life-threatening situations and also provides time critical and life saving follow up information. In addition to this, on mobile phones, AR feature can be integrated with cellular technologies and other location services so that further information about the emergency situation can be obtained over the mobile data connection. Since AR messages have the highest of priorities, it is a requirement that IBOC receivers monitor for AR message at regular intervals regardless of its operating mode. In stand-by mode Radio receivers which supports AR feature will wake up at periodic intervals to look for AR messages on a specific FM (Frequency Modulation) frequency. If there is an AR transmission, it will receive the alert and other related information. If the receiver cannot acquire AR reception, it will go back to stand-by mode to save power.

The transport and service multiplex subsystem receives a multiple audio and data input stream and organizes the data stream into packets. A service multiplex arranges packets from one or more services into a logical channel (LC) stream. An IBOC system transmits one or more LC streams. Each LC stream may contain one or more audio or data services. In some cases, a single service may have some of its data transmitted over two or more LC streams.

Most of the data being passed between the various entities (1, 2, 3) within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

The multiplexing layer 130 receives transport PDUs from transport 125 such as SIS transport, AAS data transport, and audio transport, and formats and multiplexes them into Layer 2 PDUs. A Layer 2 PDU includes protocol control information and a payload, which can be audio, data, or a combination of audio and data. Layer 2 PDUs are routed through the correct logical channels such as P1, P2, P2, . . . , PIDS, S1, S2, . . . etc to Layer 1 transmitter layer 135, wherein a logical channel is a signal path that conducts L1 PDUs through Layer 1 with a specified grade of service. Status information is also passed between Layer 2 and Layer 1.

The RF/transmission subsystem such as transmitter layer 135 receives the LC streams and performs channel coding and waveform generation like HD radio waveform 140. The RF/transmission subsystem then transmits the information to an RF receiver. Each logical stream is independently coded using a convolutional encoder, then interleaved and modulated using OFDM. Each logical stream is assigned a group of tones that carries the information. The transmitter layer 135 can perform scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 2:
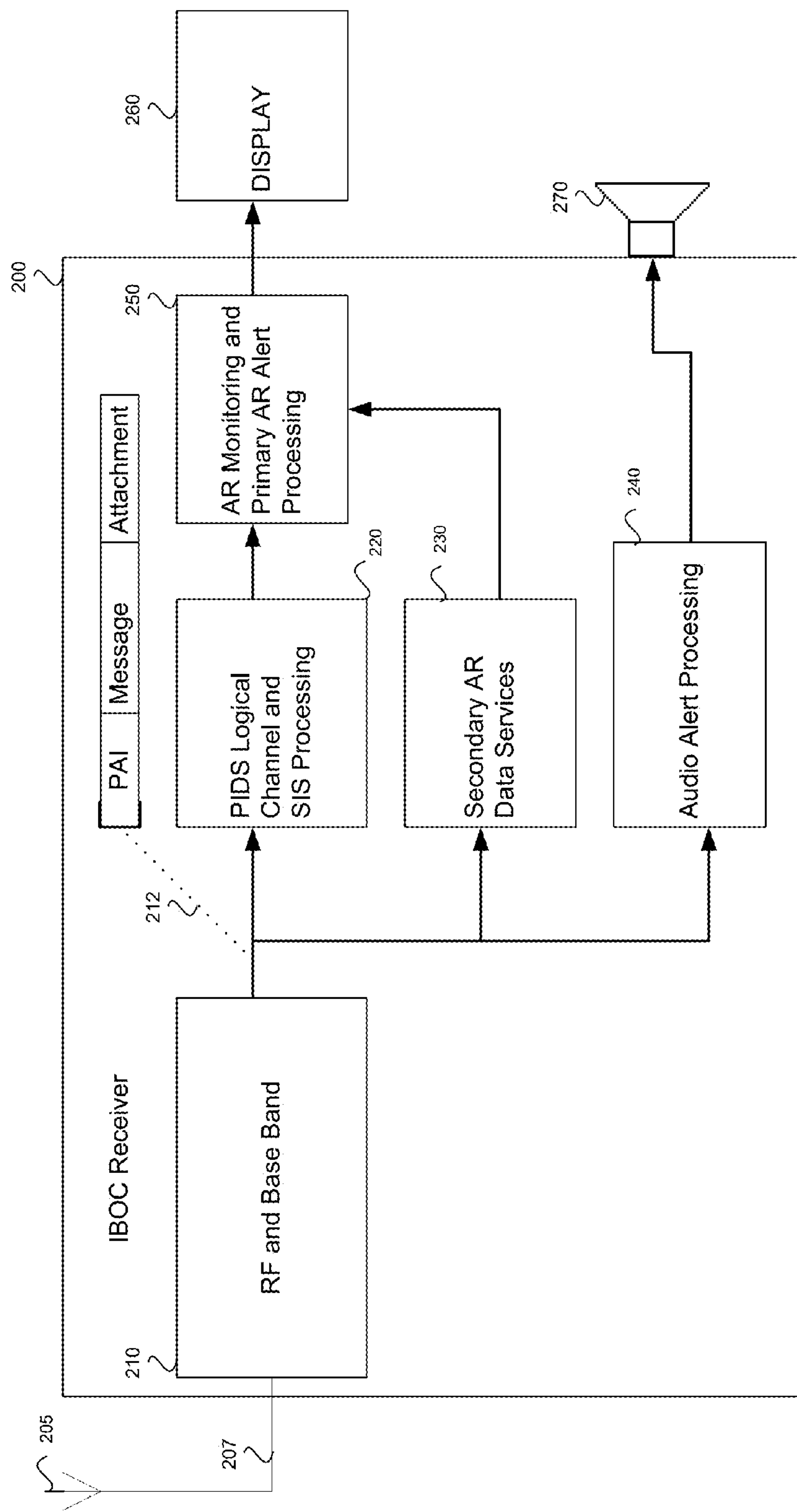
FIG. 2 is an illustration of the processing blocks involved in AR monitoring in an IBOC receiver in accordance to an embodiment.

FIG. 2 is an illustration of the processing blocks involved in AR monitoring in an IBOC receiver in accordance to an embodiment. An IBOC receiver may be deployed in a variety of products such as car radio, portable radios, MP3 players, cellular phones and navigation devices. In a typical usage model, the user of the receiver may only be using a single service out of the several services that an NRSC-5 system provides over a single physical channel. For many of these products, it may be desirable that the receiver consume as little power as possible, in order to conserve battery life. When decoding each logical channel, the radio receiver allocates a specific amount of memory for each logical channel. This memory will be used to buffer the data stream during the steps of demodulating and decoding the bit stream, until the requested data is extracted. An example of memory buffers allocated during the decoding process may be de-interleaver buffers and a second example of memory buffers is layer 2 output buffers that store the content of one or more transfer frame bits. It should be note that the receiver may be capable of allocating de-interleaving buffers and Layer 2 buffers for only the logical channels that are currently in use, thereby conserving system memory.

Table 1, below, shows the data rate and memory requirement for each logical channel for a hybrid IBOC modulation profile, i.e., PIDS, P1, P3 and P4 channels. Data in PIDS and P1 channels are interleaved in block basis, while data in P3 and P4 channels are convolutional interleaved.

TABLE 1

| Logical channel | Buffer size in bytes | Deinterleaver buffer size in bytes (assume four bits) | Number of buffers per IBOC frame | Data rate kbit/s |
|---|---|---|---|---|
| PIDS | 10 | 100 | 16 | 1 |
| P1 | 18,272 | 182,720 | 1 | 98 |
| P3 | 1,152 | 156,672 | 8 | 25 |
| P4 | 1,152 | 156,672 | 8 | 25 |

A typical radio receiver under the current state of the art is comprised of a tuner and digital signal processing hardware. These circuits produce data signals that can include, for example, a station information service (SIS), main program, supplemental program and the like, and one or more auxiliary application services. For simplicity, only the processing blocks of an IBOC receiver relevant to AR processing are included in the illustration. The illustrated AR processing blocks 200 includes an input 207 connected to an antenna 205, and acquisition stage 210 comprising a RF tuner or front end with converter for producing a baseband signal containing the AR message on line 212, PIDS logical channel and SIS processing 220, secondary AR data services 230, audio alert processing 240, AR monitoring and primary AR alert processing 250, and message reproduction devices such as display 260 and audio reproduction device 270 such as a speaker. The AR processing blocks are shown as separate components, however it should be noted that the components could be combined in a single processor (e.g., a System on a Chip (SoC)).

The AR message is embodied in different components that include primary alert information, complete message and even attachments to the complete message. The low-bit rate primary alert information (PAI) which indicates the AR transmission is sent over Station Information Service (SIS) available on the Primary IBOC Data Service (PIDS) logical channel. The rest of the AR information will be sent over IBOC Advance Application Service (AAS). AR transmission is monitored by looking for AR messages transmitted in the Station Information Service (SIS). This means that at least the PIDS logical channel, on which SIS information is available could be decoded at a periodic interval to save power. As shown in FIG. 2, the receiver aims to maximize the battery life at the same time achieving a reasonable latency in receiving AR alerts can be achieved by monitoring SIS on PIDS 220 followed with monitoring to detect a component of an active radio (AR) message 250. The occurrence of a low-bit rate signal such as the PAI could be used to tell the receiver to immediately halt timeshifted playback or transition from stand-by mode and return to the live stream for an urgent bulletin/message from the emergency broadcast system.

On a battery operated device like a mobile receiver, monitoring for AR messages at periodical interval can have a significant impact on the receiver's stand-by time. One of the reasons for this is the high power consumption of the complex IBOC processing in the HD Radio® receivers. The actual stand-by time will vary, depending on the duty-cycle of the monitoring, which in turn is a compromise between a faster AR message detection time and a longer stand-by time. The PIDS acquisition time and hence the periodic interval can be made significantly short by using the offline processing as described in FIG. 5 and FIG. 6. Offline processing is processing that can be done by the receiver during any power mode such as during a low power mode, a full power (System ON) mode, or any intermediate power mode.

Offline processing of IBOC signal is not used in conventional IBOC receiver since it requires additional memory to buffer up the received digitized samples. However when it comes to AR message detection, the disclosed embodiment can make use of existing logical channel memory such as deinterleaver and layer 2 buffer or memory used in other processes in the receiver to buffer the digitized samples to do offline processing to shorten the acquisition time for PIDS channel. AR feature detection can be integrated with cellular technologies and other location services so that further information about the emergency situation can be obtained over the mobile data connection.

Figure 3:
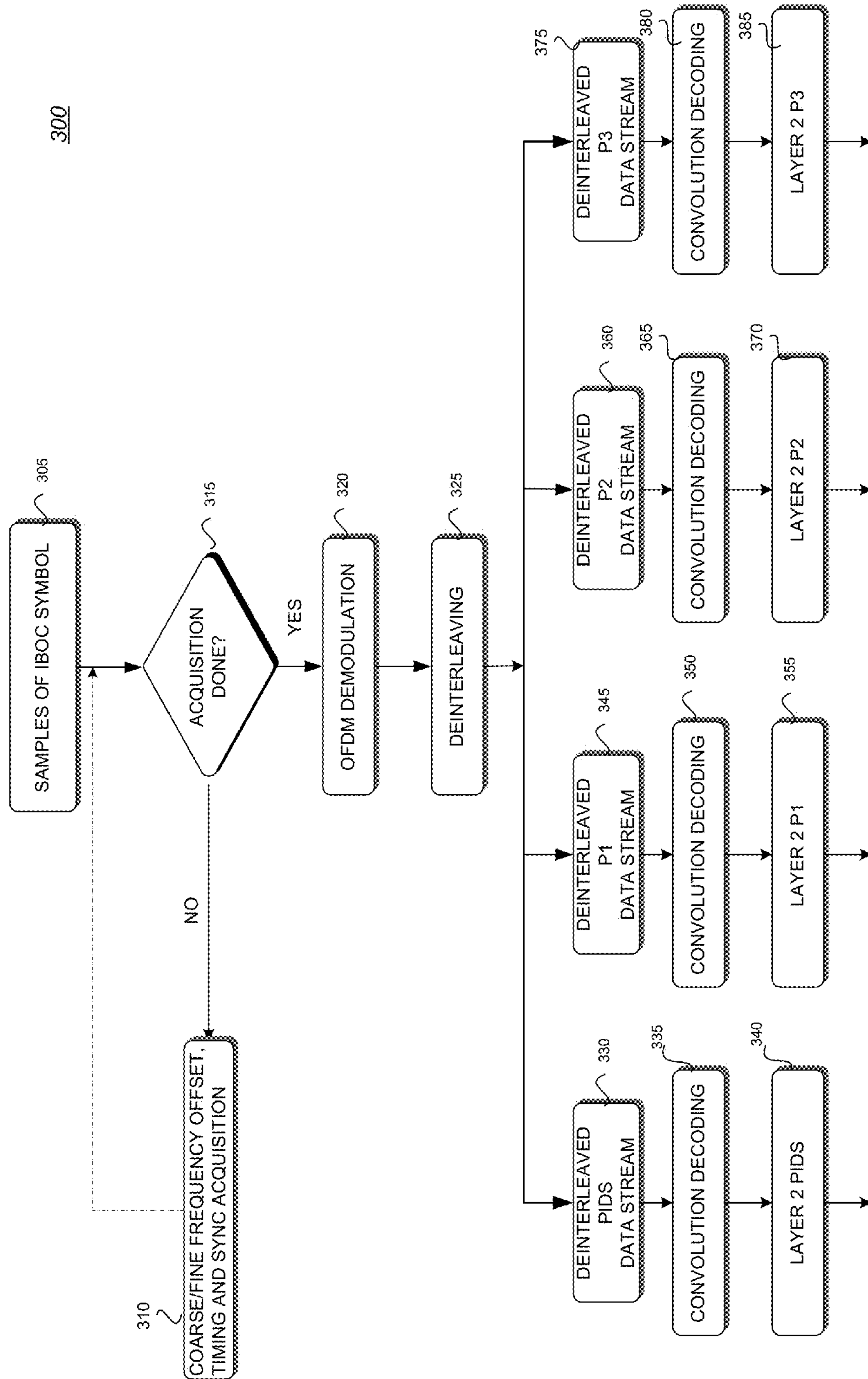
FIG. 3 is an illustration of the decoding process in an IBOC receiver in accordance to an embodiment.

FIG. 3 is an illustration of the decoding process 300 in an IBOC receiver in accordance to an embodiment. The decoding process 300 is suitable for decoding a single program within a given cluster of programs embodied in HD radio waveform 140. The input to the decoding process 300 begins with acquisition of a set of samples of IBOC symbol 305. If the receiver is tuning to a new channel, it needs to go through coarse/fine frequency offset, timing and sync acquisition 310 before it can decode IBOC symbols. When the acquisition 315 is done, the receiver can proceed to performing other decoding functions like OFDM demodulation 320 to extract information from the OFDM tones and deinterleaving 325 the information bits based on symbol indexes and tone indexes. The deinterleaved output for a selected one of the channels, i.e., PIDS, P1, P3 and P4, is applied to a sub-decoding process which recovers the information or a suitable portion thereof for a channel.

The layer 2 PIDS 340 information is obtained by the process of deinterleaved PIDS data stream 330 and convolution decoding 335. The layer 2 P1 355 information is obtained by the process of deinterleaved P1 data stream 345 and convolution decoding 350. The layer 2 P3 370 information is obtained by the process of deinterleaved P3 data stream 360 and convolution decoding 365. The layer 2 P4 385 information is obtained by the process of deinterleaved P4 data stream 375 and convolution decoding 370.

Figure 4:
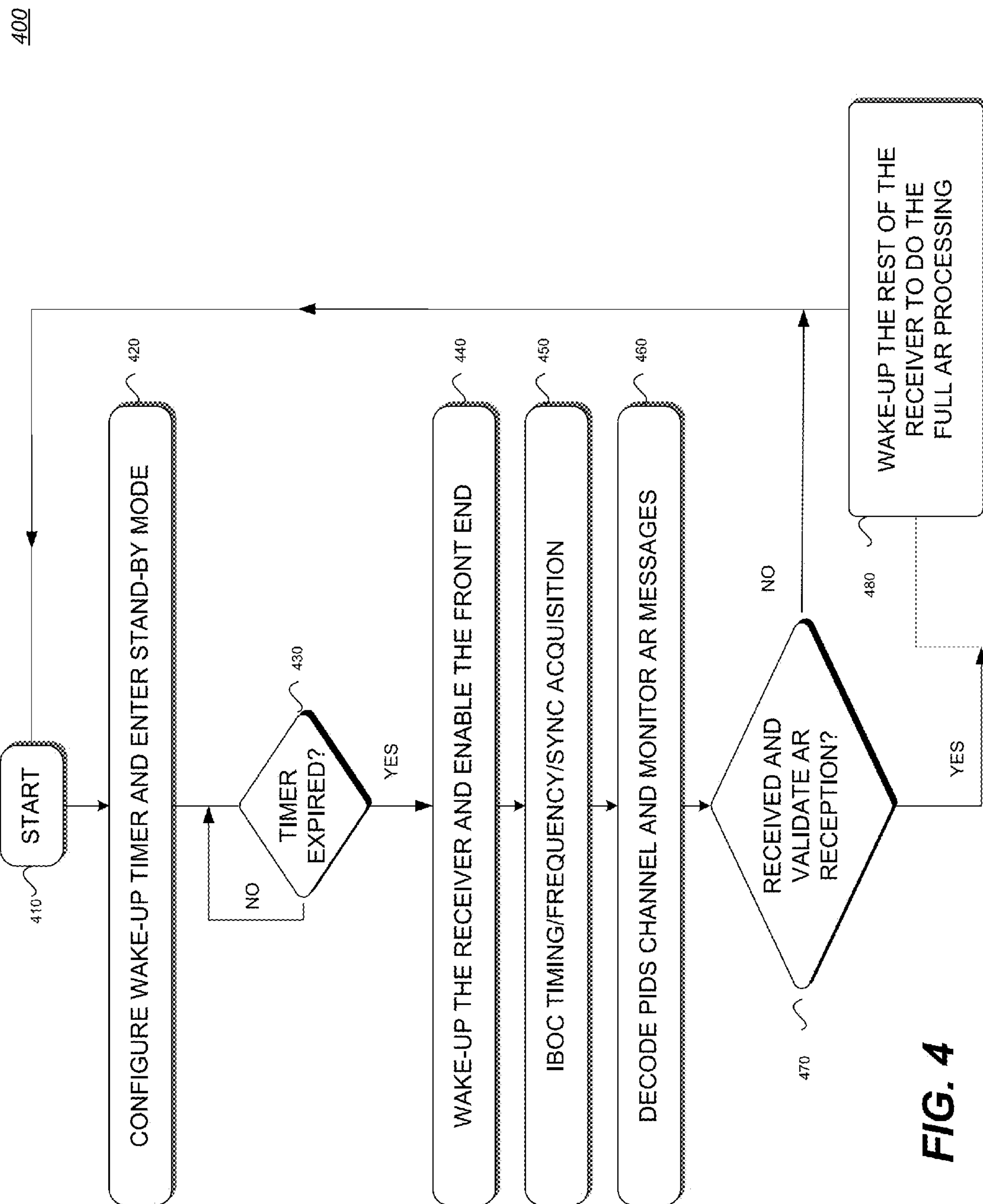
FIG. 4 is a flowchart of AR monitoring in an IBOC receiver in accordance to an embodiment.

FIG. 4 is a flowchart of AR monitoring process 400 in an IBOC receiver in accordance to an embodiment. In AR monitoring process 400 the radio receiver will wake up at periodic intervals as set by a timer to look for AR messages on a specific FM (Frequency Modulation) frequency from a set of possible frequencies known to the receiver by different methods. The AR monitoring process 400 begins with a start 410 event such as powering down of the receiver device enter low power mode. Entering low power mode can be based on an internal timer function (for example many portable devices include an automatic power off after a specified number of minutes) or when the user powers off the device. Control is then passed to action 420 where the process fetches instructions to configure a wake-up timer for AR monitoring and to enter a stand-by mode. Control is passed to action 430 where the process waits for the times to expired 430.

When the timer has expired, i.e., the timer condition is met, control is passed to action 440 where the action wakes-up the receiver and enable the front end. Upon the receiver wake-up at action 440, if the receiver is tuning to a new channel, it needs to go through coarse/fine frequency offset, timing and sync acquisition before it can decode PIDS channel. If the receiver is returning from previous acquired channel, it might be able to bypass the coarse frequency and sync acquisition if the receiver is capable of waking up clock accurately. However the receiver still needs to go through fine frequency offset and timing estimation processes to overcome the frequency drifts and accumulate effects of the timing difference between the receiver and the transmitter. For example, given 744187.5 Hz basic sampling rate of IBOC system, 1 ppm clock difference will result in 30 samples drift over the idle period of 40 seconds. In some receivers, coarse/fine frequency offset, timing and sync acquisition are processed in real time and samples used for these processes are discarded due to memory constraints.

Control is then passed to action 450, the receiver performs IBOC timing/frequency/sync acquisition. Control is then passed to action 460, where the receiver decodes PIDS channel and monitors AR messages. Control is then passed to action 470, where a decision is made on whether an AR message was received and whether the AR reception can be validated. If the decision does not validate the AR message control is returned to action 410 to enter a stand-by mode or a low power mode. Else, if the validation of the AR message is determined in action 470 control is passed to action 480 where the process wakes-up the rest of the receiver to perform full AR processing which is to decode the AR message and generate an output signal which can be supplied to an output device, e.g., a speaker or a display. Actions 440, 450, and 460 could be replace with all or some of the AR monitoring process 600 using offline processing to reduce power consumption during AR detection on battery-operated mobile devices.

Figure 5:
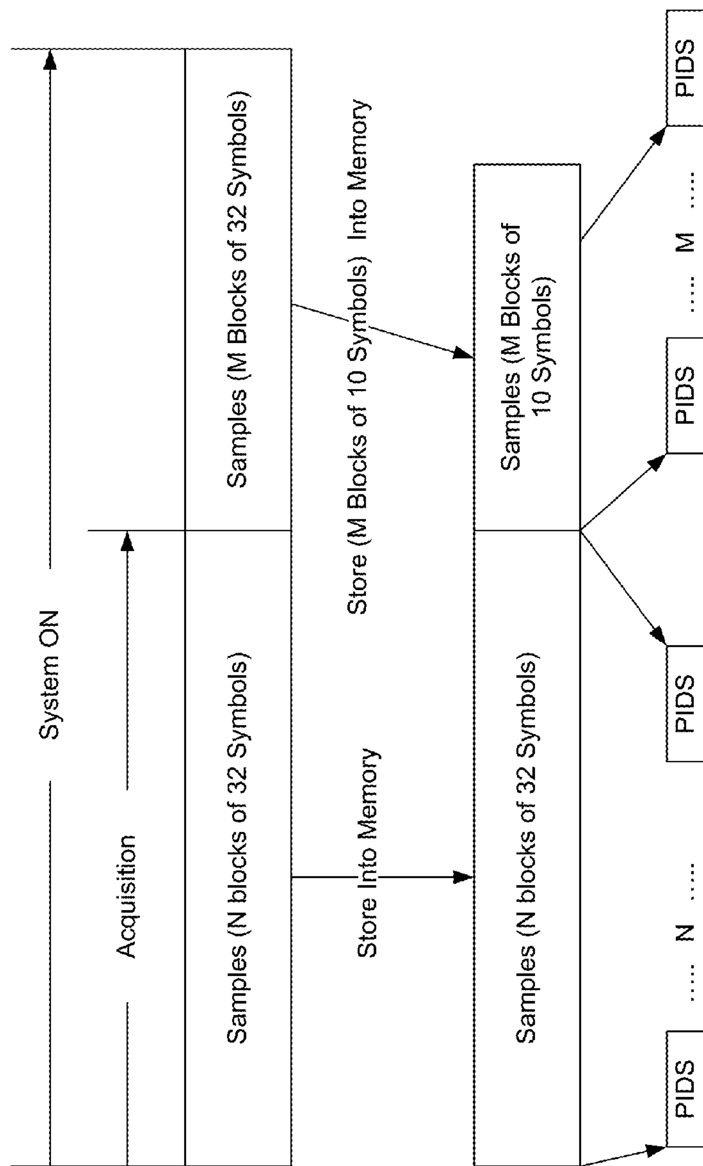
FIG. 5 illustrates the acquisition, sampling, and storing of IBOC symbols during offline processing in accordance to an embodiment.

FIG. 5 illustrates the acquisition, sampling, and storing of IBOC symbols 500 during offline processing in accordance to an embodiment. As it can be seen from Table 1, above, the PIDS channel only requires tiny amount of memory compared to other logical channels. PIDS information arrives every block (32 symbols). PIDS information is spread in 10 symbols across a block of 32 symbols. AR monitoring can be accomplished by processing the data in PIDS channels. As AR processing is only interested in monitoring the PIDS channel, the offline processing mode reuses the memory typically allocated for deinterleaver buffers, other logical channel buffers, and other processes in a receiver to store the samples. Offline processing can backward process the data in the past. For example, after finishing the acquisition processes, one can optionally apply frequency offset and adjust symbol boundary for the samples stored in the memory and further process the symbol samples to extract PIDS information instead of discarding them as done in the conventional non-offline processing method. Since offline processing is more memory intensive compared to the conventional non-offline processing method, the memory typically allocated for other logical channels can be reused for PIDS processing and keep the system memory requirement the same. By not discarding the samples used for the acquisition and reusing them for the PIDS processing and AR information extraction, off-line processing can reduce the amount of time the front end needs to power "ON" to get valid PIDS information. This enables a faster AR acquisition and reduces the energy requirement to monitor the AR information.

Figure 6:
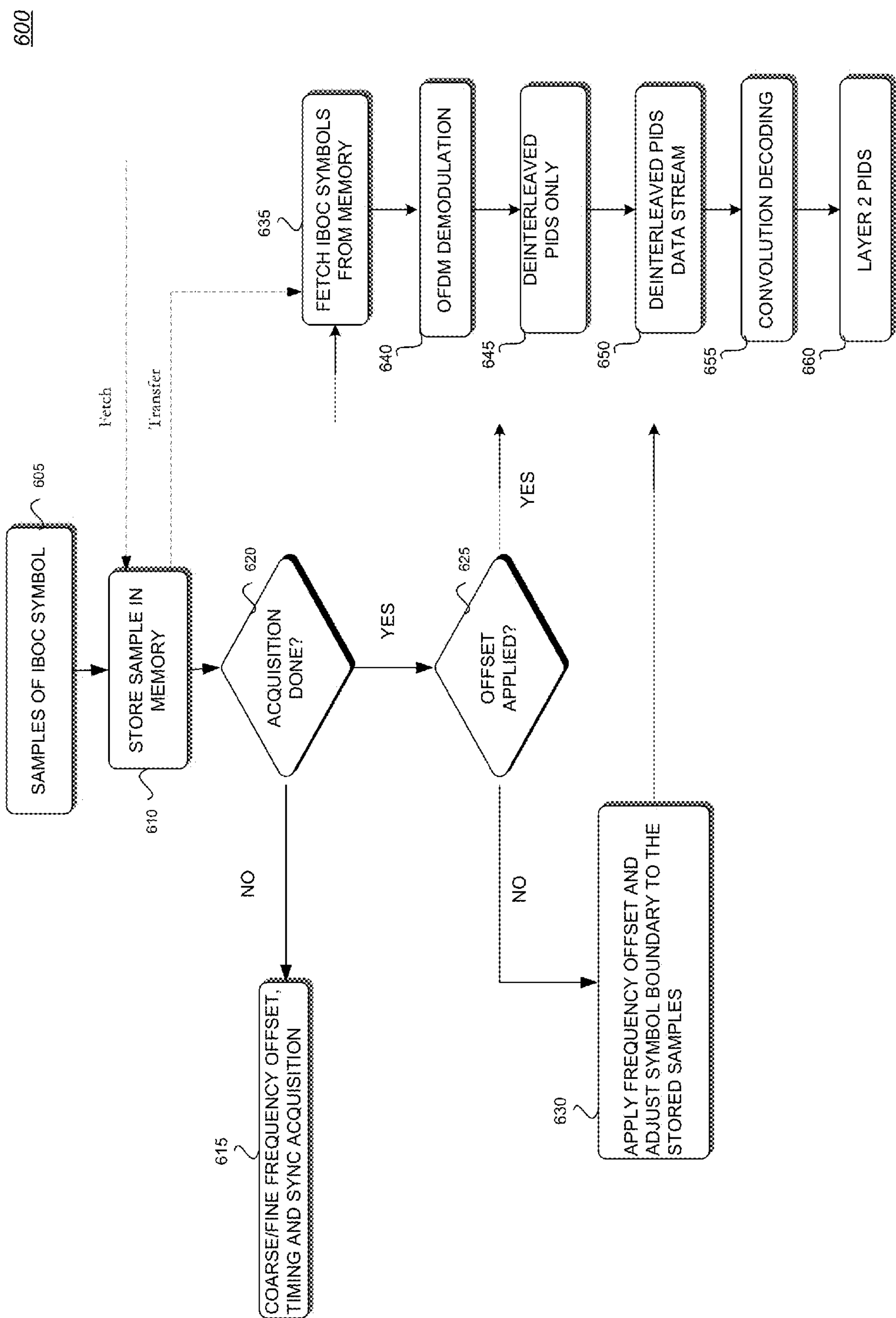
FIG. 6 is a flowchart of AR monitoring using offline processing in an IBOC receiver in accordance to an embodiment.

FIG. 6 is a flowchart of AR monitoring process 600 using offline processing in an IBOC receiver in accordance to an embodiment. AR monitoring process 600 is suitable for constantly looking for AR alerts at a periodic interval, i.e., an intervals that is shorter than the wake-up timer of action 410. Since offline processing shortens the time of acquisition of active radio (AR) messages, through monitoring of the SIS on PIDS channel, it maximize the battery life of a receiver while at the same time achieving a reasonable latency in receiving AR alerts.

AR monitoring process 600 begins with acquisition of a set of samples of IBOC symbol 605. After acquisition of the samples in action 605, in action 610 the process stores the sample in memory such as memory allocated to other logical channels or other processes in a receiver. However, for offline processing, after acquisition only the symbols that contain PIDS information are stored in the memory. Samples of the symbols which do not contain PIDS information can be discarded once useful information such as pilots are extracted. After acquisition, there is higher number of buffered symbols to be processed. However, as noted above with reference to FIG. 5 22 out 32 symbols do not have PIDS information at all. The offline process will catch up during these less instruction processing demanding symbol period. An advantage of offline processing is to reduce the on time for AR monitoring and increases the battery life of mobile device that supports active radio. Control is then passed to action 620

In action 620, if the acquisition stage is tuning to a new channel, it needs to go through coarse/fine frequency offset, timing and sync acquisition 615 before it can decode IBOC symbols. When the acquisition is done the process can proceed to performing other offline processing operations. In action 625, if offsets are not applied then in action 630 the process applies frequency offset and adjust symbol boundary to the stored samples. Alternatively, if offsets are applied then control is passed to action 635.

In action 635, the IBOC symbols are fetched from memory. After fetching the IBOC symbols the method can proceed to performing other decoding functions like OFDM demodulation 640, deinterleaving PIDS only 645, deinterleaving PIDS Data Stream 650, Convolution decoding 655, and generate the Layer 2 PIDS 660. The PIDS are then processed to validate AR reception. If the low-bit rate primary alert information which indicates the AR transmission is sent over Station Information Service (SIS) is present, and then wakes-up the rest of the receiver to perform full AR message processing.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The following examples pertain to further embodiments and specifics in the examples may be used anywhere in one or more embodiments:

As a first example, an embodiment may comprise a method comprising: after acquisition of a broadcast signal transmitted in an in-band on-channel (IBOC) format, offline processing a segment of the broadcast signal to detect a component of an active radio (AR) message.

One embodiment may comprise the method as recited in the first example, wherein offline processing a segment of the broadcast signal comprises extracting primary IBOC data service (PIDS) information from the broadcast signal One embodiment may comprise the method as recited in the first example, wherein if there is validation of AR reception then transitioning to online processing of the broadcast signal to acquire all the components of an active radio (AR) message.

As a second example, an embodiment may comprise in a receiver, a non-transitory computer readable medium encoded with computer executable instructions, which when accessed, cause a machine to perform operations comprising: after acquisition of a broadcast signal transmitted in an in-band on-channel (IBOC) format, offline processing a segment of the broadcast signal to detect a component of an active radio (AR) message.

As a third example, an embodiment may comprise a receiver, comprising: a receiver for receiving a multichannel signal that is broadcast in an in-band on-channel (IBOC) format containing multiple broadcast streams contained within a single channel and wherein one or more of the broadcast streams among the multiple broadcast streams possibly contains an active radio (AR) message; at least one buffer to store at least portions of a service data stream with AR message; and a processor coupled to the receiver, wherein the processor is operable to: after acquisition of the multichannel signal, offline processing the broadcast streams to detect a component of the active radio (AR) message.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method comprising:

after acquisition of a broadcast signal transmitted in an in-band on-channel (IBOC) format, offline processing a segment of the broadcast signal to detect a component of an active radio (AR) message;

offline processing a segment of the broadcast signal comprising extracting primary IBOC data service (PIDS) information from the broadcast signal;

wherein the offline processing shortens time of acquisition of an active radio (AR) message to thereby optimize power consumption in a receiver based on processing during a low power mode in a receiver having at least two power modes.

2. The method in accordance to claim 1, wherein the AR message comprises at least one of primary alert information component, complete message component, or attachment component.

3. The method in accordance to claim 2, wherein the primary alert information component indicates the AR message is sent over Station Information Service (SIS).

4. The method in accordance to claim 3, wherein detecting a component of AR message is validating an AR reception.

5. The method in accordance to claim 4, further comprising:

if there is validation of AR reception then transitioning to online processing of the broadcast signal to acquire all the components of an active radio (AR) message.

6. The method in accordance to claim 4, wherein offline processing comprises using memory allocated to other logical channels or other processes in a receiver to store samples of IBOC symbols for PIDS processing.

7. In a receiver, a non-transitory computer readable medium encoded with computer executable instructions, which when accessed, cause a machine to perform operations comprising:

after acquisition of a broadcast signal transmitted in an in-band on-channel (IBOC) format, offline processing a segment of the broadcast signal to detect a component of an active radio (AR) message;

offline processing a segment of the broadcast signal comprising extracting primary IBOC data service (PIDS) information from the broadcast signal;

wherein the offline processing shortens time of acquisition of an active radio (AR) message to thereby optimize power consumption in a receiver based on processing during a low power mode in a receiver having at least two power modes.

8. The non-transitory computer readable medium encoded with computer executable instructions in accordance to claim 7, wherein the AR message comprises at least one of primary alert information component, complete message component, or attachment component.

9. The non-transitory computer readable medium encoded with computer executable instructions in accordance to claim 8, wherein the primary alert information component indicates the AR message is sent over Station Information Service (SIS).

10. The non-transitory computer readable medium encoded with computer executable instructions in accordance to claim 9, wherein detecting a component of AR message is validating an AR reception.

11. The non-transitory computer readable medium encoded with computer executable instructions in accordance to claim 10, further comprising if there is validation of AR reception then transitioning to online processing of the broadcast signal to acquire all the components of an active radio (AR) message.

12. The non-transitory computer readable medium encoded with computer executable instructions in accordance to claim 10, wherein offline processing comprises using memory allocated to other processes or other logical channels to store samples of IBOC symbols for PIDS processing.

13. A receiver, comprising:

a receiver for receiving a multichannel signal that is broadcast in an in-band on-channel (IBOC) format containing multiple broadcast streams contained within a single channel and wherein one or more of the broadcast streams among the multiple broadcast streams possibly contains an active radio (AR) message;

at least one buffer to store at least portions of a service data stream with AR message; and a processor coupled to the receiver, wherein the processor is operable to:

after acquisition of the multichannel signal, offline processing a segment of the broadcast streams to detect a component of the active radio (AR) message;

offline processing a segment of the broadcast streams comprising extracting primary IBOC data service (PIDS) information from the broadcast streams;

wherein the offline processing shortens time of acquisition of an active radio (AR) message to thereby optimize power consumption in a receiver based on processing during a low power mode in a receiver having at least two power modes.

14. The receiver in accordance to claim 13, wherein the AR message comprises at least one of primary alert information component, complete message component, or attachment component.

15. The receiver in accordance to claim 14, wherein the primary alert information component indicates the AR message is sent over Station Information Service (SIS).

16. The receiver in accordance to claim 15, wherein detecting a component of AR message is validating an AR reception.

17. The receiver in accordance to claim 16, the processor further performing:

if there is validation of AR reception then transitioning to online processing of the broadcast streams to acquire all the components of an active radio (AR) message.

18. The receiver in accordance to claim 16, wherein offline processing comprises using memory allocated to other processes or other logical channels to store samples of IBOC symbols for PIDS processing.

* * * * *